United States Patent
Gan et al.

(10) Patent No.: US 10,198,018 B2
(45) Date of Patent: Feb. 5, 2019

(54) SYSTEMS AND METHODS FOR CONVEX RELAXATIONS AND LINEAR APPROXIMATIONS FOR OPTIMAL POWER FLOW IN MULTIPHASE RADIAL NETWORKS

(71) Applicant: California Institute of Technology, Pasadena, CA (US)

(72) Inventors: Lingwen Gan, Sunnyvale, CA (US); Steven H. Low, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 881 days.

(21) Appl. No.: 14/724,757

(22) Filed: May 28, 2015

(65) Prior Publication Data
US 2015/0346753 A1 Dec. 3, 2015

Related U.S. Application Data

(60) Provisional application No. 62/004,046, filed on May 28, 2014.

(51) Int. Cl.
*G05B 15/02* (2006.01)
*G06Q 50/06* (2012.01)
(Continued)

(52) U.S. Cl.
CPC ............ *G05F 1/66* (2013.01); *G05B 15/02* (2013.01); *G06Q 50/06* (2013.01); *H02J 3/006* (2013.01);
(Continued)

(58) Field of Classification Search
CPC .. G05F 1/66; G06Q 50/06; H02J 3/006; H02J 13/0006; H02J 13/0093; H02J 2003/007;
(Continued)

(56) References Cited

U.S. PATENT DOCUMENTS 6,625,520 B1 * 9/2003 Chen .................. H02J 3/00
700/286
7,852,050 B2 * 12/2010 Berggren ............ H02J 3/1828
323/216
(Continued)

FOREIGN PATENT DOCUMENTS

JP 2012083989 A 4/2012
WO 2012015507 A1 2/2012
(Continued)

OTHER PUBLICATIONS

A Three-Phase Power Flow Method for Real-Time Distribution System Analysis; Cheng et al., 9 pages; May 1995.*
(Continued)

*Primary Examiner* — Ronald D Hartman, Jr.
(74) *Attorney, Agent, or Firm* — KPPB LLP

(57) ABSTRACT

Centralized node controllers in accordance with embodiments of the invention enable linear approximation of optimal power flow. One embodiment includes a centralized node controller including: a network interface, a processor, and a memory containing: a centralized power control application a network topology, where the network is multiphase unbalanced and comprises a plurality of connected nodes; wherein the processor is configured by the centralized controller application to: request node operating parameters from the plurality of connected nodes; calculate network operating parameters using a linear approximation of optimal power flow and the node operating parameters from the plurality of connected nodes; send network operating parameters to the plurality of connected nodes.

15 Claims, 11 Drawing Sheets

(51) Int. Cl.
H02J 13/00 (2006.01)
G05F 1/66 (2006.01)
H02J 3/00 (2006.01)
(52) U.S. Cl.
CPC ...... *H02J 13/0006* (2013.01); *H02J 13/0093* (2013.01); *H02J 2003/007* (2013.01); *Y02E 40/76* (2013.01); *Y02E 60/76* (2013.01); *Y04S 10/525* (2013.01); *Y04S 10/545* (2013.01); *Y04S 40/22* (2013.01)
(58) Field of Classification Search
CPC ......... G05B 15/02; Y02E 40/76; Y02E 60/76; Y04S 10/525; Y04S 10/545; Y04S 40/22
See application file for complete search history.

(56) References Cited

U.S. PATENT DOCUMENTS

| | | | | |
|---|---|---|---|---|
| 9,564,757 | B2* | 2/2017 | Wang | H02J 3/00 |
| 9,863,985 | B2* | 1/2018 | Giannakis | G01R 21/133 |
| 2008/0077368 | A1* | 3/2008 | Nasle | G05B 17/02 |
| | | | | 703/4 |
| 2010/0217550 | A1 | 8/2010 | Crabtree et al. | |
| 2011/0043220 | A1 | 2/2011 | Leibowitz et al. | |
| 2012/0029720 | A1 | 2/2012 | Cherian et al. | |
| 2012/0316691 | A1 | 12/2012 | Boardman et al. | |
| 2012/0326503 | A1 | 12/2012 | Birkelund et al. | |
| 2013/0238148 | A1* | 9/2013 | Legbedji | G06Q 10/04 |
| | | | | 700/286 |
| 2013/0268131 | A1* | 10/2013 | Venayagamoorthy | G05F 5/00 |
| | | | | 700/286 |
| 2014/0379157 | A1* | 12/2014 | Das | H02J 3/14 |
| | | | | 700/295 |
| 2015/0051744 | A1* | 2/2015 | Mitra | G06Q 50/06 |
| | | | | 700/286 |
| 2016/0036226 | A1 | 2/2016 | Gan et al. | |
| 2016/0254669 | A1* | 9/2016 | Zhang | B29C 67/0055 |
| | | | | 363/35 |

FOREIGN PATENT DOCUMENTS

| | | |
|---|---|---|
| WO | 2012058114 A2 | 5/2012 |
| WO | 2012167383 A1 | 12/2012 |
| WO | 2015184188 A1 | 12/2015 |
| WO | 2016022603 A1 | 2/2016 |

OTHER PUBLICATIONS

The IV Formulation and Linear Approximations of the AC Optimal Power Flow Problem; O'Neill et al.; 18 pages Dec. 2012.*
Convex Relaxation of Optimal Power Flow Part I: Formulations and Equivalence; Steven H Low; 44 pages; Mar. 2014.*
Optimal Power Flow Via Quadratic Modeling; Ye Tao; 194 pages; Dec. 2011.*
Branch Flow Model relxations, convection; Farivar et al., 69 pages; May 2012.*
International Preliminary Report on Patentability for International Application PCT/US2015/033055, Report issued Nov. 29, 2016, dated Dec. 8, 2016, 8 Pgs.
International Search Report and Written Opinion for International Application PCT/US2015/033055, Report Completed Sep. 9, 2015, dated Sep. 9, 2015, 11 Pgs.
"IEEE distribution test feeders", online at available at http ://ewh. ieee.org/sco/pes/ dsacom/testf eeders/.
Bai et al., "Semidefinite programming for optimal power flow problems", Electrical Power and Energy Systems, 2008, vol. 30, pp. 383-392.
Baran, M. E. et al., "Network reconfiguration in distribution systems for loss reduction and load balancing", IEEE Transactions on Power Delivery, Apr. 1989, vol. 4, No. 2, pp. 1401-1407.

Berg et al., "Mechanized Calculation of Unbalanced Load Flow on Radial Distribution Circuits", IEEE Transactions on Power Apparatus and Systems, vol. PAS-86, Issue 4, Apr. 1967, pp. 415-421.
Cain et al., "History of optimal power flow and formulations; Optimal Power Flow Paper 1", Federal Energy Regulatory Commission, Dec. 2012, 36 pgs.
Castillo et al., "Survey of approaches to solving the ACOPF; Optimal Power Flow Paper 4", Federal Energy Regulatory Commission, Mar. 2013, 49 pgs.
Chen et al., "Distribution system power flow analysis—a rigid approach", IEEE Transactions on Power Delivery, vol. 6, Issue 3, Jul. 1991, pp. 1146-1152.
Dall'Anese et al., "Distributed Optimal Power Flow for Smart Microgrids", EEE Transactions on Smart Grid, arXiv:1211.5856v5, Jan. 25, 2014, pp. 1-11, Retrieved from the Internet: http://arxiv.org/pdf/1211.5856.pdf.
Frank et al., "Opti-mal power flow: a bibliographic survey I, Formulations and deterministic methods", Energy Systems, 2012, vol. 3, No. 3, pp. 221-258.
Fukuda et al., "Exploiting sparsity in semidefinite programming via matrix completion i: General framework", SIAM Journal on Optimization, 2001, vol. 11, No. 3, pp. 647-674.
Huneault et al., "A survey of the opt-imal power flow literature", IEEE Transactions on Power Systems, May 1991, vol. 6, No. 2, pp. 762-770.
Jabr et al., "Radial Distribution Load Flow Using Conic Programming", IEEE Transactions on Power Systems, Aug. 2006, vol. 21, Issue 3, pp. 1458-1459.
Kersting et al., "Distribution System Modeling and Analysis", CRC Press, 2006, 329 pgs. (presented in two parts).
Lavaei et al., "Zero duality gap in optimal power flow problem", IEEE Transactions on Power Systems, 2012, vol. 27, No. 1, pp. 92-107.
Low, "Convex relaxation of optimal power flow, II: exactness", IEEE Trans. on Control of Network Systems, Jun. 2014, vol. 1, No. 2, pp. 177-189.
Low, "Convex Relaxation of Optimal Power Flow; Part I: Formulations and Equivalence", IEEE Trans. on Control of Network Systems, Mar. 15-27, 2014, vol. 1, No. 1, 44 pgs., Retrieved from the Internet: http://arxiv.org/pdf/1405, May 5, 2014.
Momoh et al., "A review of selected optimal power flow literature to 1993. Part I: Nonlinear and quadratic programming approaches", IEEE Transactions on Power Systems, Feb. 1999, vol. 14, No. 1, pp. 96-104.
Pandya et al., "A survey of optimal power flow methods", Journal of Theoretical and Applied Information Technology, 2008, vol. 4, No. 5, pp. 450-458.
Sturm, "Using SeDuMi 1.02, a matlab toolbox for optimization over symmetric cones", Optimization Methods and Software, Mar. 1999, vol. 11, No. 1-4, pp. 625-653.
International Preliminary Report on Patentability for International Application PCT/US2015/043676, Report issued Feb. 7, 2017, dated Feb. 16, 2017, 6 Pgs.
International Search Report and Written Opinion for International Application No. PCT/US2015/043676, Search completed Oct. 27, 2015, dated Oct. 27, 2015, 8 Pgs.
Alsac et al., "Further developments in LP-based optimal power flow", IEEE Transactions on Power Systems, vol. 5, Issue 3, Aug. 1990, pp. 697-711.
Baptista, E. C. et al., "Logarithmic barrier-augmented lagrangian function to the optimal power flow problem", International Journal on Electrical Power and Energy Systems, Jun. 23, 2005, vol. 27, No. 7, pp. 528-532.
Capitanescu, F. et al., "Interior-point based algorithms for the solution of optimal power flow problems", Electric Power Systems Research, vol. 77, Issues 5-6, Apr. 2007, pp. 508-517, https://doi.org/10.1016/j.epsr.2006.05.003.
Contaxis, G. C. et al., "Decoupled Optimal Load Flow Using Linear or Quadratic Programming", IEEE Transactions on Power Systems, vol. 1, Issue 2, May 1986, pp. 1-7.
Farivar, M. et al., "Inverter VAR control for distribution systems with renewables", In IEEE SmartGridComm, Oct. 17-20, 2011, pp. 457-462.

(56) References Cited

OTHER PUBLICATIONS

Farivar, M. et al., "Optimal Inverter VAR Control in Distribution Systems with High PV Penetration", In PES General Meeting, Jul. 22-26, 2012, pp. 1-7.

Gan, L. et al., "Convex Relaxations and Linear Approximation for Optimal Power Flow in Multiphase Radial Networks", In Power systems computation conference, Aug. 18-22, 2014, 9 pgs.

Grant, M. et al., "Cvx: Matlab software for disciplined convex programming", online at http://cvxr.com/cvx/, 2008, 2 pages.

Jabr, R. A. et al., "A primal-dual interior-point method to solve the optimal power flow dispatching problem", Optimization and Engineering, Feb. 12, 2003, vol. 4, No. 4, pp. 309-336.

Min, W. et al., "A trust region interior point algorithm for optimal power flow problems", Electrical Power and Energy Systems, May 2005, vol. 27, No. 4, pp. 293-300.

Sousa, A. A. et al., "Robust optimal power flow solution using trust region and interior methods", IEEE Transactions on Power Systems, May 2011, vol. 26, No. 2, pp. 487-499.

Stott, B. et al., "DC power flow revisited", IEEE Transactions on Power Systems, Aug. 2009, vol. 24, No. 3, pp. 1290-1300.

Stott, B. et al., "Fast decoupled load flow", IEEE Transactions on Power Apparatus and Systems, May 1974, vol. PAS-93(3), pp. 859-869.

Torres, G. L. et al., "An interior-point method for nonlinear optimal power flow using voltage rectangular coordinates", IEEE Transactions on Power Systems, Nov. 1998, vol. 13, No. 4, pp. 1211-1218.

Turitsyn, K. et al., "Local control of reactive power by distributed photovoltaic generators", In IEEE SmartGridComm, Oct. 4-6, 2010, pp. 79-84.

Xiao, Y. et al., "Power flow control approach to power systems with embedded FACTS devices", IEEE Transactions on Power Systems, Nov. 2002, vol. 17, No. 4, pp. 943-950.

\* cited by examiner

| Network | BIM-SDP | | | BFM-SDP | | |
|---|---|---|---|---|---|---|
| | value | time | ratio | value | time | ratio |
| IEEE 13-bus | 152.7 | 1.08 | 9.5E-09 | 152.7 | 0.79 | 1.60E-10 |
| IEEE 34-bus | -100.0 | 1.97 | 1.0 | 5.001E-05 | 3.00 | 0.712 |
| IEEE 37-bus | 212.3 | 2.32 | 1.1E-08 | 212.3 | 2.00 | 9.00E-11 |
| iEEE 123-bus | -7140 | 6.02 | 2.2E-02 | 229.8 | 7.55 | 5.0E-12 |
| Rossi 2065-bus | -100.0 | 111.56 | 1.0 | 19.15 | 90.32 | 4.80E-08 |

*FIG. 10A*

| Network | BIM-SDP | | | BFM-SDP | | |
|---|---|---|---|---|---|---|
| | value | time | ratio | value | time | ratio |
| IEEE 13-bus | 152.7 | 1.05 | 8.2E-09 | 152.7 | 0.74 | 2.80E-10 |
| IEEE 34-bus | -100.0 | 2.22 | 1.0 | 279.0 | 1.64 | 3.30E-11 |
| IEEE 37-bus | 212.3 | 2.66 | 1.5E-08 | 212.2 | 1.95 | 1.30E-10 |
| iEEE 123-bus | -8917 | 7.21 | 3.2E-02 | 229.8 | 8.86 | 6.0E-12 |
| Rossi 2065-bus | -100.0 | 115.5 | 1.0 | 19.15 | 96.98 | 4.30E-08 |

*FIG. 10B*

| Network | time | | error | |
|---|---|---|---|---|
| | FBS | LBF | $V$(p.u.) | $S$(%) |
| IEEE 13-bus | 0.11s | 0.03s | 4.5E-04 | 3.1 |
| IEEE 34-bus | 0.16s | 0.02s | 1.0E-03 | 4.2 |
| IEEE 37-bus | 0.12s | 0.02s | 2.0E-04 | 1.5 |
| IEEE 123-bus | 0.37s | 0.07s | 5.5E-04 | 3.3 |
| Rossi 2065-bus | 4.73s | 0.98s | 1.6E-03 | 5.3 |

FIG. 11

SYSTEMS AND METHODS FOR CONVEX RELAXATIONS AND LINEAR APPROXIMATIONS FOR OPTIMAL POWER FLOW IN MULTIPHASE RADIAL NETWORKS

CROSS-REFERENCE TO RELATED APPLICATIONS

The present invention claims priority to U.S. Provisional Patent Application Ser. No. 62/004,046 entitled "Optimal Power Flow in Multiphase Radial Network" to Gan et al., filed May 28, 2014. The disclosure of U.S. Provisional Patent Application Ser. No. 62/004,046 is herein incorporated by reference in its entirety.

STATEMENT OF FEDERALLY SPONSORED RESEARCH

This invention was made with government support under Grant No. DE-AR0000226 awarded by the U.S Department of Energy and Grant No. CNS0911041 awarded by the National Science Foundation. The government has certain rights in the invention.

FIELD OF THE INVENTION

The present invention relates to optimal power flow and more specifically to linear approximations of optimal power flow on multiphase unbalanced networks.

BACKGROUND

An incredible amount of infrastructure is relied upon to transport electricity from power stations, where the majority of electricity is currently generated, to individual homes. Power stations can generate electricity in a number of ways including using fossil fuels or using renewable sources of energy such as solar, wind, and hydroelectric sources. Once electricity is generated it travels along transmission lines to substations. Substations typically do not generate electricity, but can change the voltage level of the electricity as well as provide protection to other grid infrastructure during faults and outages. From here, the electricity travels over distribution lines to bring electricity to individual homes. The infrastructure used to transport electricity through the power grid can be viewed as a graph comprised of nodes and lines. The power stations substations, and any end user can be considered nodes within the graph. Transmission and distribution lines connecting these nodes can be represented by lines.

Distributed power generation, electricity generation at the point where it is consumed, is on the rise with the increased use of residential solar panels and is fundamentally changing the path electricity takes to many users' homes. The term "smart grid" describes a new approach to power distribution which leverages advanced technology to track and manage the distribution of electricity. A smart grid applies upgrades to existing power grid infrastructure including the addition of more renewable energy sources, advanced smart meters that digitally record power usage in real time, and bidirectional energy flow that enables the generation and storage of energy in additional locations along the electrical grid.

SUMMARY OF THE INVENTION

Centralized node controllers in accordance with embodiments of the invention enable linear approximation of optimal power flow. One embodiment includes a centralized node controller including: a network interface, a processor, and a memory containing: a centralized power control application a network topology, where the network is multiphase unbalanced and comprises a plurality of connected nodes; wherein the processor is configured by the centralized controller application to: request node operating parameters from the plurality of connected nodes; calculate network operating parameters using a linear approximation of optimal power flow and the node operating parameters from the plurality of connected nodes; send network operating parameters to the plurality of connected nodes.

In a further embodiment, the linear approximation of optimal power flow further includes the assumption of small line losses.

In another embodiment, the linear approximation of optimal power flog further includes the assumption of nearly balanced voltage.

In a still further embodiment, the linear approximation of optimal power flow is evaluated using the following expressions:

LPF:

$$\sum_{i:\,i\to j} \Lambda_{ij} + s_j = \sum_{k:\,j\to k} \Lambda_{jk}^{\Phi_j}, \quad j \in \mathcal{N};$$

$$S_{ij} = \gamma^{\Phi_{ij}} \text{diag}(\Lambda_{ij}), \quad i \to j;$$

$$v_j = v_i^{\Phi_{ij}} - S_{ij} z_{ij}^H - z_{ij} S_{ij}^H, \quad i \to j.$$

where i, j, and k are nodes in the plurality of connected nodes, $\Lambda$ and S are power flows, s is a complex power injection, v is a voltage, z is a phase impedance matrix, and $\gamma$ is a matrix of constants.

In still another embodiment, the network topology further includes a radial network.

In a yet further embodiment, the network topology further includes a network modeled on Kirchoffs laws.

In yet another embodiment, the network topology further includes a bus injection model (BIM) network model In a further embodiment again, the network topology further comprises a branch flow model (BFM) network model.

In another embodiment again, the network topology is simplified using a convex relaxation.

In a further additional embodiment, the convex relaxation is a semidefinite programming (SDP) relaxation.

In another additional embodiment, the SDP relaxation exploits a radial network topology.

In a still yet further embodiment, the network topology further includes a bus injection model (BIM) network topology, and wherein the SDP relaxation exploiting a radial network topology further includes a BIM-SDP which is evaluated using the following expression:

BIM-SDP:

$$\min \sum_{i \in \mathcal{N}} C_i(s_i)$$

over s, v, W where i is a node in the plurality of connected nodes, $\mathcal{N}$ is the plurality of connected nodes, s is a power injection, v is a voltage, C is a function of optimal power flow, and W is a constraint.

In still yet another embodiment, the BIM-SDP is subject to constraints.

In a still further embodiment again, the constraints are evaluated using the following expressions:

$$\min \sum_{i \in \mathcal{N}} C_i(s_i)$$

over $s_i \in \mathbb{C}^{|\Phi_i|}$ and $v_i \in \mathbb{H}^{|\Phi_i| \times |\Phi_i|}$ for $i \in \mathcal{N}$;

$W_{ij} \in \mathbb{C}^{|\Phi_{ij}| \times |\Phi_{ij}|}$ for $i \sim j$, s.t. $s_i = \sum_{j:\, i \sim j} \text{diag}\left[\left(v_i^{\Phi_{ij}} - W_{ij}\right) y_{ij}^H\right]^{\Phi_i}$, $i \in \mathcal{N}$;

$s_i \in S_i$, $i \in \mathcal{N}^+$;

$v_0 = V_0^{ref}\left(V_0^{ref}\right)^H$;

$\underline{v}_i \leq \text{diag}(v_i) \leq \overline{v}_i$, $i \in \mathcal{N}^+$;

$W_{ij} = W_{ji}^H$, $i \to j$;

$\begin{bmatrix} v_i^{\Phi_{ij}} & W_{ij} \\ W_{ji} & v_j \end{bmatrix} \succeq 0$, $i \to j$;

where i, and j, are nodes in the plurality of connected nodes, $\mathcal{N}$ is the plurality of connected nodes, C is a function of optimal power flow, s is a power flow, $\mathbb{C}$ is a complex matrix, v and V are voltages, $\mathbb{H}$ is a set of complex Hermitian matrices, $\Phi$ is a phase, y is an inverse phase impedance matrix, and W is a constraint.

In still another embodiment again, the network topology further includes a branch flow model (BFM) network topology, and wherein the SDP relaxation exploiting a radial network topology further includes a BFM-SDP which is evaluated using the following expression:

BFM-SDP:

$$\min \sum_{i \in \mathcal{N}} C_i(s_i)$$

over $s, v, S, l$ where i is a node in the plurality of connected nodes, $\mathcal{N}$ is the plurality of connected nodes, s is a power injection, v is a voltage, C is a function of optimal power flow, S is a power flow, and l is a slack variable.

Another further embodiment of the method of the invention includes: BFM-SDP is subject to constraints.

Still another further embodiment of the method of the invention includes: the constraints are evaluated using the following expressions:

$$\min \sum_{i \in \mathcal{N}} C_i(s_i)$$

over $s_i \in \mathbb{C}^{|\Phi_i|}$, $v_i \in \mathbb{H}^{|\Phi_i| \times |\Phi_i|}$ for $i \in \mathcal{N}$;

$S_{ij} \in \mathbb{C}^{|\Phi_{ij}| \times |\Phi_{ij}|}$, $l_{ij} \in \mathbb{H}^{|\Phi_{ij}| \times |\Phi_{ij}|}$ for $i \to j$, s.t. $\sum_{i:\, i \to j} \text{diag}(S_{ij} - z_{ij} l_{ij}) + s_j = \sum_{k:\, j \to k} \text{diag}(S_{jk})^{\Phi_j}$, $j \in \mathcal{N}$;

$s_i \in S_i$, $i \in \mathcal{N}^+$;

$v_0 = V_0^{ref}\left(V_0^{ref}\right)^H$;

$\underline{V}_i \leq \text{diag}(v_i) \leq \overline{V}_i$, $i \in \mathcal{N}^+$;

$v_j = v_i^{\Phi_{ij}} - (S_{ij} z_{ij}^H + z_{ij} S_{ij}^H) + z_{ij} l_{ij} z_{ij}^H$, $i \to j$;

$\begin{bmatrix} v_i^{\Phi_{ij}} & S_{ij} \\ S_{ij}^H & l_{ij} \end{bmatrix} \succeq 0$, $i \to j$;

where i, j, and k are nodes in the plurality of connected nodes, $\mathcal{N}$ is the plurality of connected nodes, C is a function of optimal power flow, s is a power flow, $\mathbb{C}$ is a complex matrix, v and V are voltages, $\mathbb{H}$ is a set of complex Hermitian matrices, $\Phi$ is a phase, S is a power flow, l is a slack variable, and z is a phase impedance matrix.

BRIEF DESCRIPTION OF THE DRAWINGS

FIGS. 10A-10B are tables illustrating simulated results of Bus Injection Model SDP and Branch Flow Model SDP with a 5% and 10% voltage flexibility respectively in accordance with an embodiment of the invention.

FIG. 11 is a table illustrating simulated results of the accuracy of a linear approximation Linear Power Flow (LPF) compared to a forward backward sweep algorithm in accordance with an embodiment of the invention.

DETAILED DESCRIPTION

Figure 1:
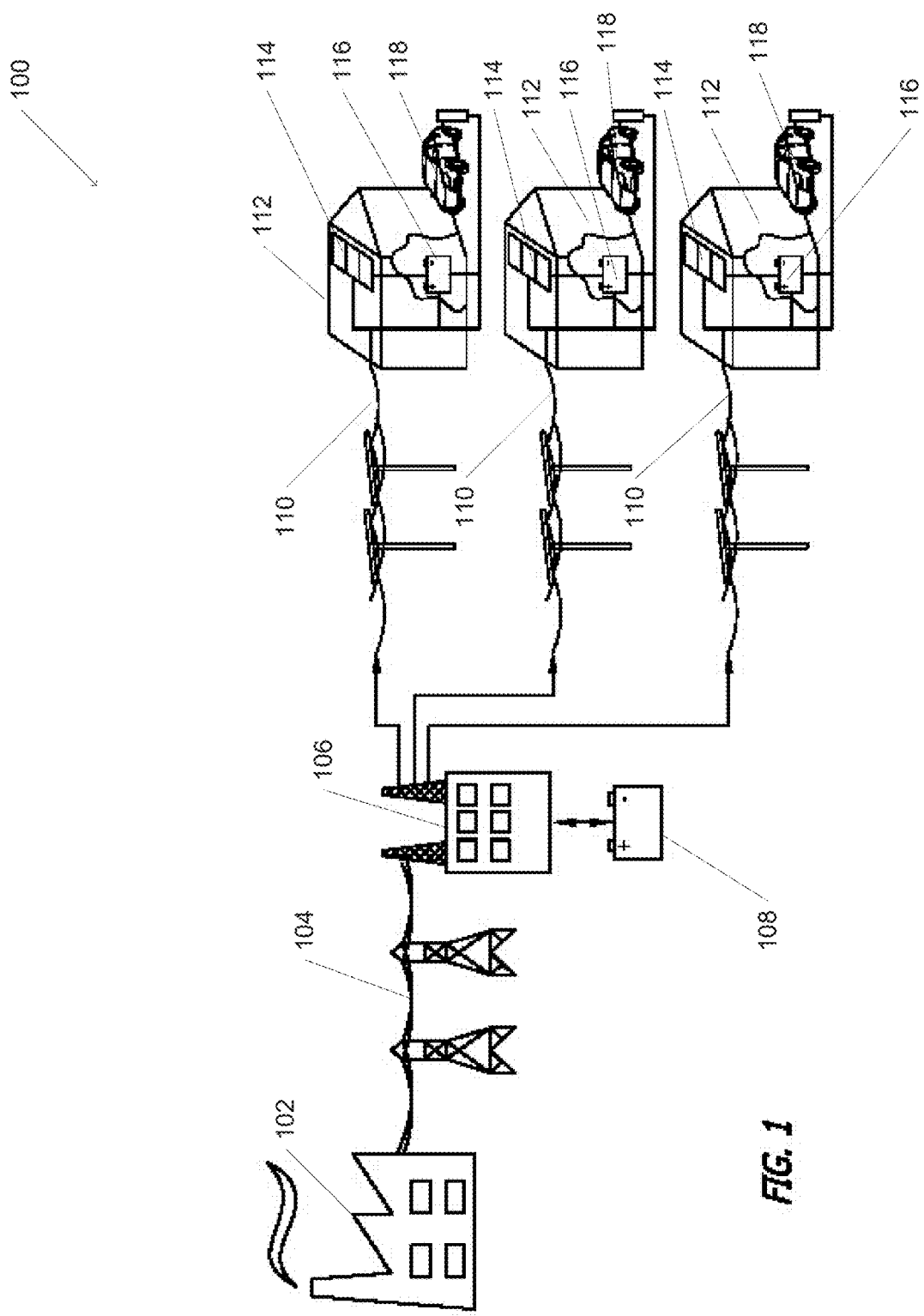
FIG. 1 is a diagram conceptually illustrating a power distribution network in accordance with an embodiment of the invention.

Turning now to the drawings, systems and methods for centralized control of power distribution systems configured as radial networks in accordance with embodiments of the invention are illustrated. In many embodiments, processes are performed to control multiphase unbalanced power distribution networks, in several embodiments, the processes are also utilized to perform control of single phase and/or multiphase balanced power distribution networks. The term single phase is used to describe a power distribution network that incorporates a single alternating current source. When several sources are used, and the sources are distributed in equally spaced regular intervals (typically 120 degrees for a commonly used three phase network), the power distribution network is described as multiphase balanced network. Single phase and multiphase balanced network problems can often be solved with similar analysis. In the discussions to follow, networks that distribute power in a single phase or a multiphase balanced manner are both be referred to single phase networks. An alternative method of distributing power is multiphase unbalanced. In this manner of power distribution, several voltage sources are, unevenly spaced. Multiphase unbalanced networks often require a different analysis due to the complexity in unevenly distributed voltages compared to single phase and/or multiphase balanced networks. Unless otherwise noted, multiphase unbalanced networks will be referred to as multiphase networks. Single phase and multiphase power distribution networks can both be represented as a radial network. Radial networks have a tree topology where each node is connected to a single unique ancestor and a set of unique children. Radial networks can be utilized in modeling the distribution side of the power grid.

In many embodiments, processing nodes are distributed throughout a power distribution network that control power load, distributed power generation, and remote battery storage. In several embodiments, the processing nodes control the operational parameters of aspects of the power distribution network in an effort to achieve what is often referred to as Optimal Power Flow (OPF). Achieving OPF involves optimizing the operation of a power system with respect to one or more objectives. These objectives can include (but are not limited to) minimizing the amount of power lost during the transmission of power to a user, minimizing the cost of generating the power needed for the system, and/or seeking to optimize other general operational constraints.

In several embodiments, a centralized processor determines operating parameters for a node of the power distribution network by performing a linear approximation using information received from nodes within the power distribution network. The nodes that can be controlled include (but are not limited to) a dynamic load, a distributed power generator (e.g. residential solar array), or battery storage. The operational parameters that are controlled typically depend upon the nature of the controlled node and can include (but are not limited to) voltage, power injection, current, and/or impedance. In many embodiments, the specific linear approximation calculation utilized by the centralized processor is selected based upon a semidefinite program (SDP) relaxation of a solution for optimal power flow in a multiphase unbalanced power distribution network. In several embodiments, the SDP relaxation takes advantage of a power distribution network's radial network topology to obtain significant computational efficiency in a calculation of OPF. While much of the discussion that follows involves centralized calculation of operational parameters for nodes of a power distribution network, a number of embodiments of the present invention perform centralized, distributed, and/or hybrid processes that coordinate the control of the power distribution network. In general, centralized processes can be considered to use a centralized processing system to calculate operational parameters for nodes within the power distribution network that are then distributed to the nodes via a communication network. By contrast, distributed processes involve individual nodes determining their operating parameters and often rely upon messages passed between processing nodes. Hybrid processes are typically regarded as using a combination of centralized and distributed processes.

Systems and methods for performing centralized control of radial power distribution networks to achieve OPF and solutions to the centralized OPF problem that can be utilized in the implementation of such systems and methods in accordance with embodiments of the invention are discussed further below.

Radial Power Distribution Networks

A power distribution network in accordance with an embodiment of the invention is shown in FIG. 1. Electricity is generated in power generator 102. Power transmission lines 104, can transmit electricity between the power generator and power substation 106. Power substation 106 additionally can connect to large storage battery 108, which temporarily stores electricity, as well as power distribution lines 110. The power distribution lines 110 can transmit electricity from the power substation to homes 112. The homes can include solar panels 114, a house battery 116, and/or an electric car 118. Power distribution networks can transmit electricity in many ways including (but not limited to) single phase, multiphase balanced, and multiphase unbalanced. In a number of embodiments, processes are utilized that achieve OPF in multiphase (unbalanced) networks.

The power generator 102 can represent a power source including those using fossil fuels, nuclear, solar, wind, or hydroelectric power. Substation 106 changes the voltage of the electricity for more efficient power distribution. Solar panels 114 are distributed power generation sources, and can generate power to supply the home as well as generate additional power for the power grid. House battery 116 can store excess electricity from the solar panels to power the home when solar energy is unavailable, or store electricity from the power grid to use at a later time. Substations 106, large storage batteries 108, homes 112, solar panels 114, house batteries 116, and electric cars 118 can all be considered to be nodes within the power distribution network and the distribution lines 110 can be considered to be lines within the power distribution network. In combination, nodes and lines form a radial network. In many embodiments, node controllers are located at nodes throughout the network to control the operating parameters of different nodes to achieve OPF. Connected nodes can be nodes within the power distribution network that are connected by distribution and/or transmission lines and can be controlled by a node controller. The type of control utilized can depend on the specifics of the network and may include distributed, centralized, and/or hybrid power control. Although many different systems are described above with reference to FIG. 1, any of a variety of power distribution network including node controllers may be utilized to perform power distribution as appropriate to the requirements of specific applications in accordance with embodiments of the invention. Nodes utilizing node controllers connected to a communication network in accordance with various embodiments of the invention are discussed further below.

Node Controller Architectures

Figure 2:
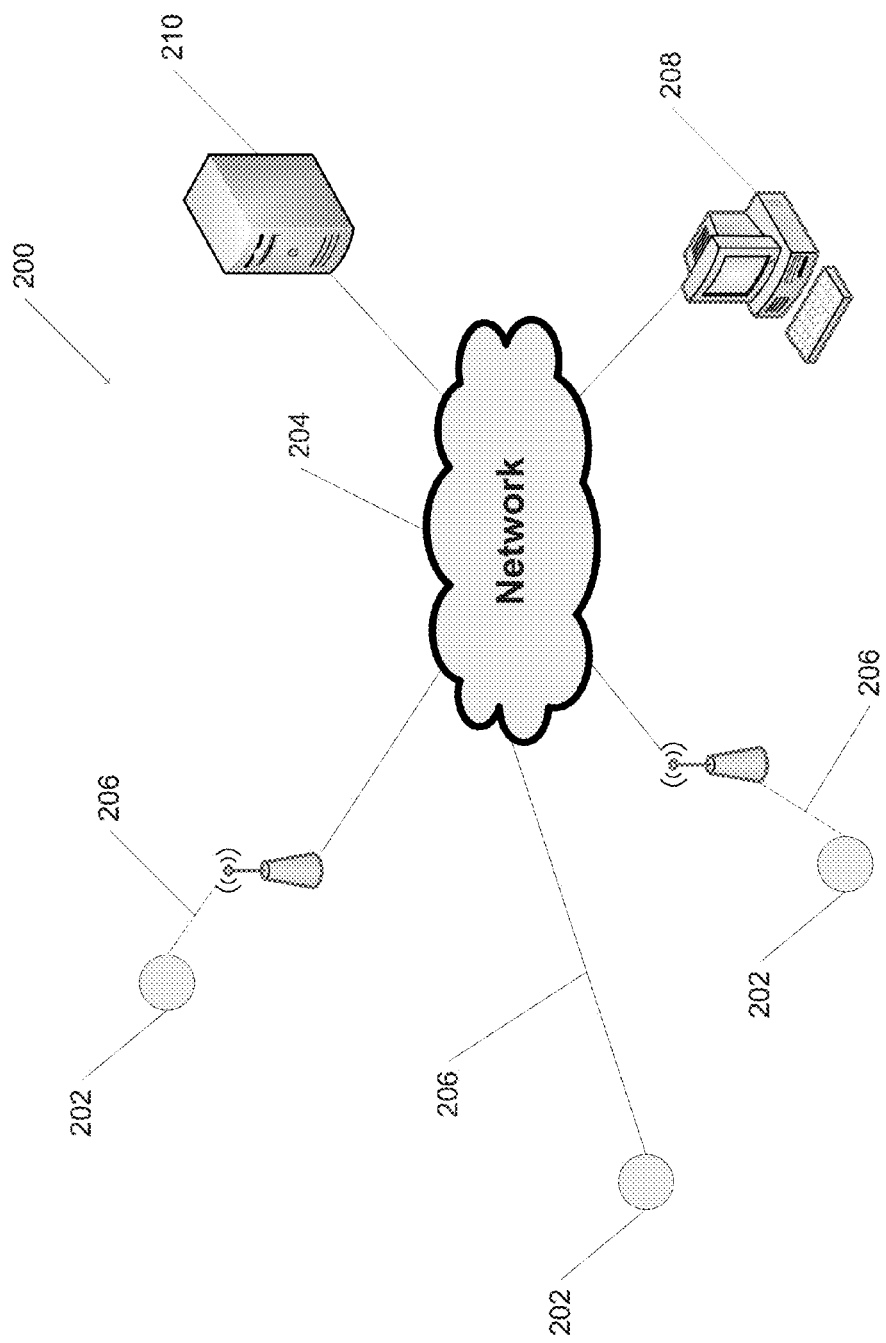
FIG. 2 is a diagram conceptually illustrating nodes within a power distribution network that are controlled by node controllers, which communicate via a communication network, in accordance with an embodiment of the invention.

Nodes utilizing node controllers connected to a communication network in accordance with an embodiment of the invention are shown in FIG. 2. Nodes 202 can connect to communication network 204 using a wired and/or wireless connection 206. In some embodiments the power distribution network can act in place of the communication network. The communication network may also be connected to one or more centralized computer systems 208 to monitor calculations made by or to send instructions to multiple node controllers to, for example, control power distribution in the network at a global level. Additionally, in many embodiments a database management system 210 can be connected to the network to track node data which, for example, may be used to historically track power usage at various locations over time. Although various system configurations are described above with reference to FIG. 2, any number of systems can be utilized to achieve centralized control of nodes within a power distribution network as appropriate to the requirements of specific applications in accordance with embodiments of the invention. Centralized controllers in accordance with various embodiments of the invention are discussed further below.

Centralized Controller

Figure 3:
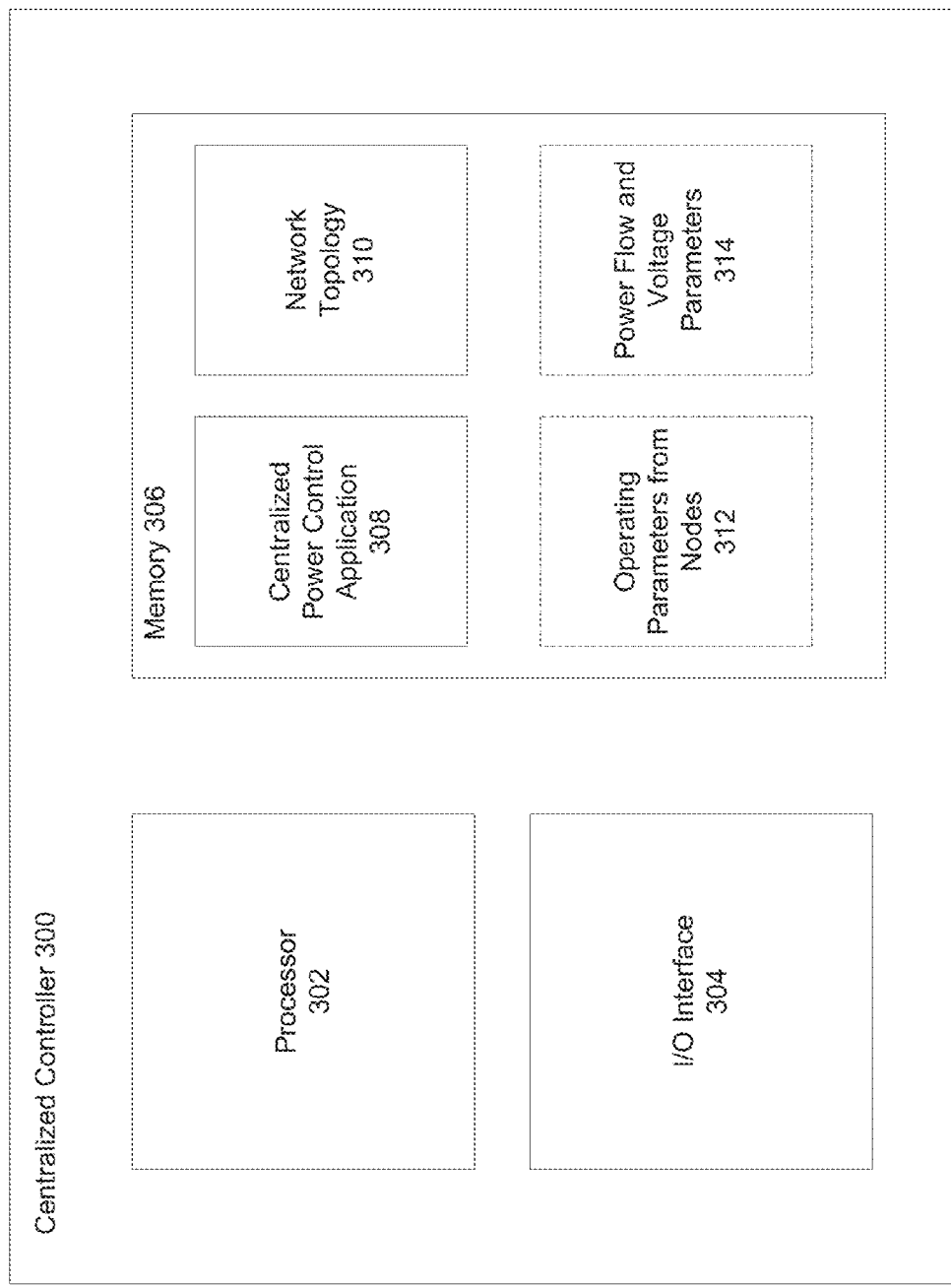
FIG. 3 is a block diagram of a centralized controller in accordance with an embodiment of the invention.

A centralized controller in accordance with an embodiment of the invention is shown in FIG. 3. In various embodiments, centralized controller 300 can perform calculations using one or more centralized computer systems to determine operating parameters for nodes on a radial network. As noted above, many embodiments of the invention include a centralized controller that is configured to determine the operating parameters for nodes in a radial multiphase network. In the illustrated embodiment, the centralized controller includes at least one processor 302, an I/O interface 304, and a memory 306. The at least one processor 302, when configured by software stored in memory, can perform calculations on and make changes to data passing through the I/O interface as well as data stored in memory. In many embodiments, the memory 306 includes software including the centralized power control application 308, as well as network topology 310, operating parameters from nodes 312, and power flow and voltage parameters 314. The centralized controller can calculate power flow and voltage parameters for the network using operating parameters it receives through the I/O interface from lodes in the network. The centralized power control application 308 will be discussed in greater detail below and can enable the centralized controller to perform calculations to solve for optimal power flow using a linear approximation. This linear approximation performed on operating parameters for one or more nodes in the network can specifically involve a convex relaxation that exploits network topology when solving for power flow and operating parameters. Although a number of different centralized controllers are described above with reference to FIG. 3, any of a variety of computing systems can be utilized to control a centralized controller within a power distribution system as appropriate to the requirements of specific applications in accordance with various embodiments of the invention. Node controllers in accordance with various embodiments of the invention are discussed further below.

Node Controller

Figure 4:
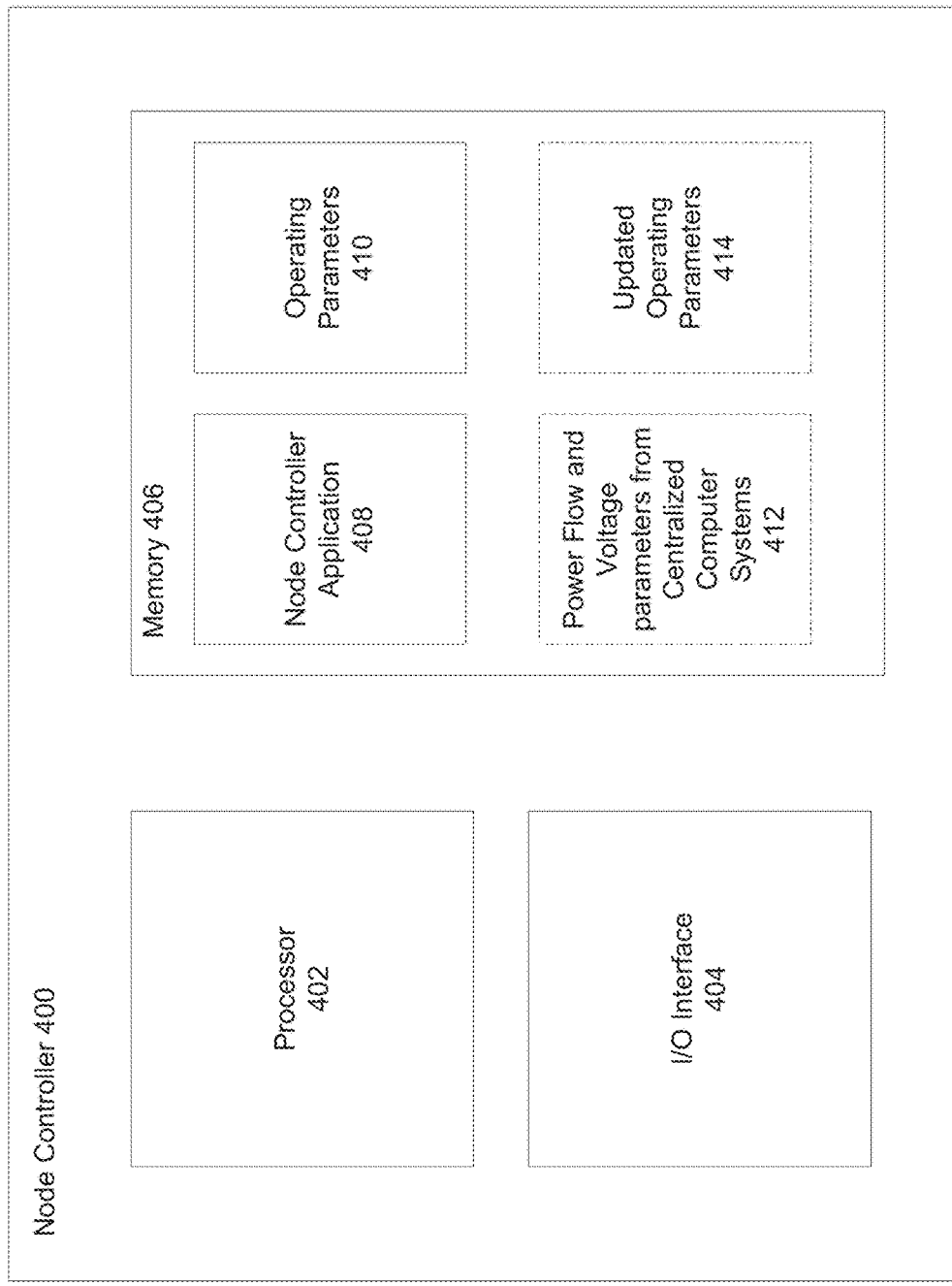
FIG. 4 is a block diagram of a node controller in accordance with an embodiment of the invention.

A node controller in accordance with an embodiment of the invention is shown in FIG. 4. In various embodiments, node controller 400 can control the operating parameters of one or more nodes in a (radial) power distribution network. In the illustrated embodiment, the node controller includes at least one processor 402, an 1110 interface 404, and memory 406. The at least one processor 402, when configured by software stored in memory, can perform calculations on and make changes to data passing through the I/O interface as well as data stored in memory, in many embodiments, the memory 406 includes software including a node controller application 408 as well as operating parameters 410, power flow and voltage parameters from one or more centralized computer systems 412, and updated operating parameters 414. A node can update operating parameters of one or more nodes within the power distribution network by using operating parameters received from one or more centralized computer systems in the case of a centralized or hybrid approach. Various operating parameters of a node that can be controlled by a node controller are also discussed further below, and may include (but are note limited to) node voltage, current, impedance, and power injection. Although a number of different node controller implementations are described above with reference to FIG. 4, any of a variety of computing systems can be utilized to control a node within a power distribution system as appropriate to the requirements of specific applications in accordance with various embodiments of the invention. As noted above, node controllers in accordance with many embodiments of the invention can control the operation of nodes within a radial power distribution network in such a way as to approach OPF based upon operating parameters received from the centralized controller. Use of centralized controllers and node controllers to implement OPF in a centralized manner within a radial network in accordance with various embodiments of the invention are discussed further below.

Use of Centralized Controllers to Achieve Optimal Power Flow

Centralized controllers in accordance with many embodiments of the invention utilize processes that control nodes in a manner that attempts to achieve OPF in a computationally efficient manner. In order to do this, a linear approximation has been developed enabling calculations to be performed for one or more nodes at one or more centralized computer systems. Overall the linear approximation for OPF can efficiently approximate operating parameters for nodes in the entire network. Various models can be used to develop a linear approximation solution that can be utilized to achieve OPF in a power distribution network.

The branch flow model (BFM) and the bus injection model (BIM) can be used for solving the OPF problem. The BFM focuses on the current and power in the branches of the model, and the BIM focuses on current, voltage, and power injection at the nodes of the model. Although the BFM and the BIM are generated with different sets of equations and variables, they produce related solutions since they are both modeled based on Kirchhoff's laws. The process utilized by the node controllers in accordance with various embodiments of the invention utilizes calculations determined by the BFM. Many network shapes can be used to construct the BFM, such as a radial network. In certain cases the structure of a radial network can simplify the computations of the power equations in the OPF problem. Additionally, a convex relaxation of the model can further simplify the calculations. An approach to solve for OPF in a muliphase network using SDP relaxation is described in detail below. As can readily be appreciated, any of a variety of techniques that solve for OPF in multiphase networks can be utilized as the basis for configuring node controllers as appropriate to the requirements of specific applications in accordance with various embodiments of the invention. Therefore, the inventions described herein should not be considered to be limited to the specific linear approximations discussed below.

Optimal Power Flow Models

Figure 5:
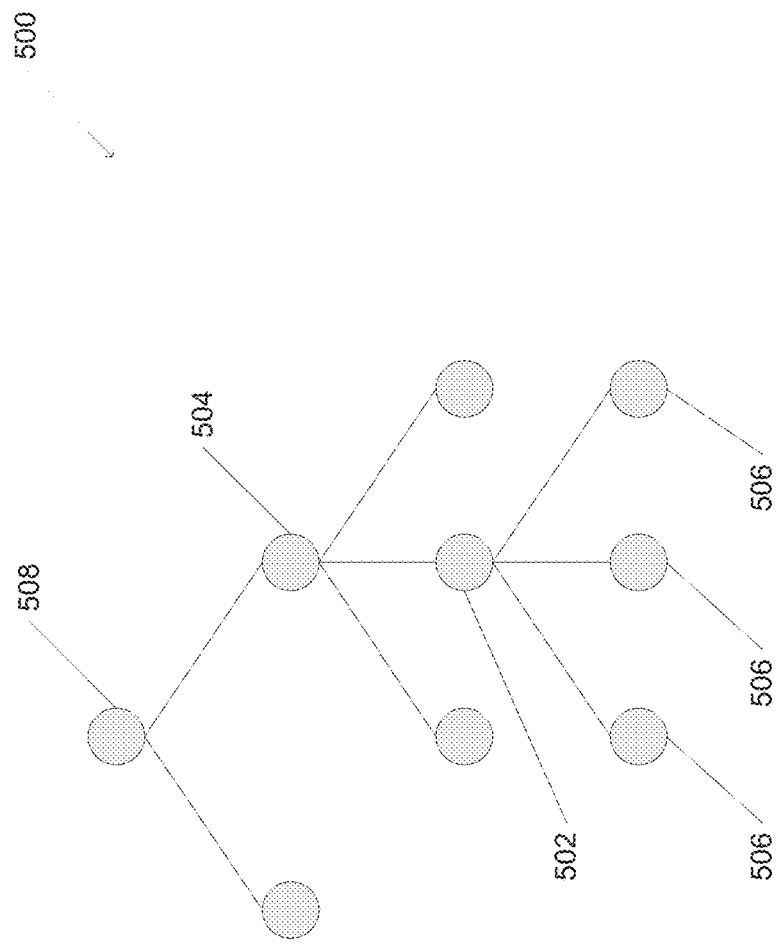
FIG. 5 is a diagram illustrating a radial network in accordance with an embodiment of the invention.

A radial network in accordance with an embodiment of the invention is shown in FIG. 5. In various embodiments, radial network 500 includes a node 502. Node 502 has an ancestor node 504 and one or more children nodes 506. A radial network also has a unique root node 508. A detailed discussion of these nodes is discussed further below. Although many radial networks are described above with reference to FIGS. 3 and 4, any of a variety of network configurations can be utilized as the network shape as appropriate to the requirements of specific applications in accordance with embodiments of the invention. The relationship between nodes and operation parameters in a OPF model (such as BIM or BFM) is discussed further below.

Figure 6:
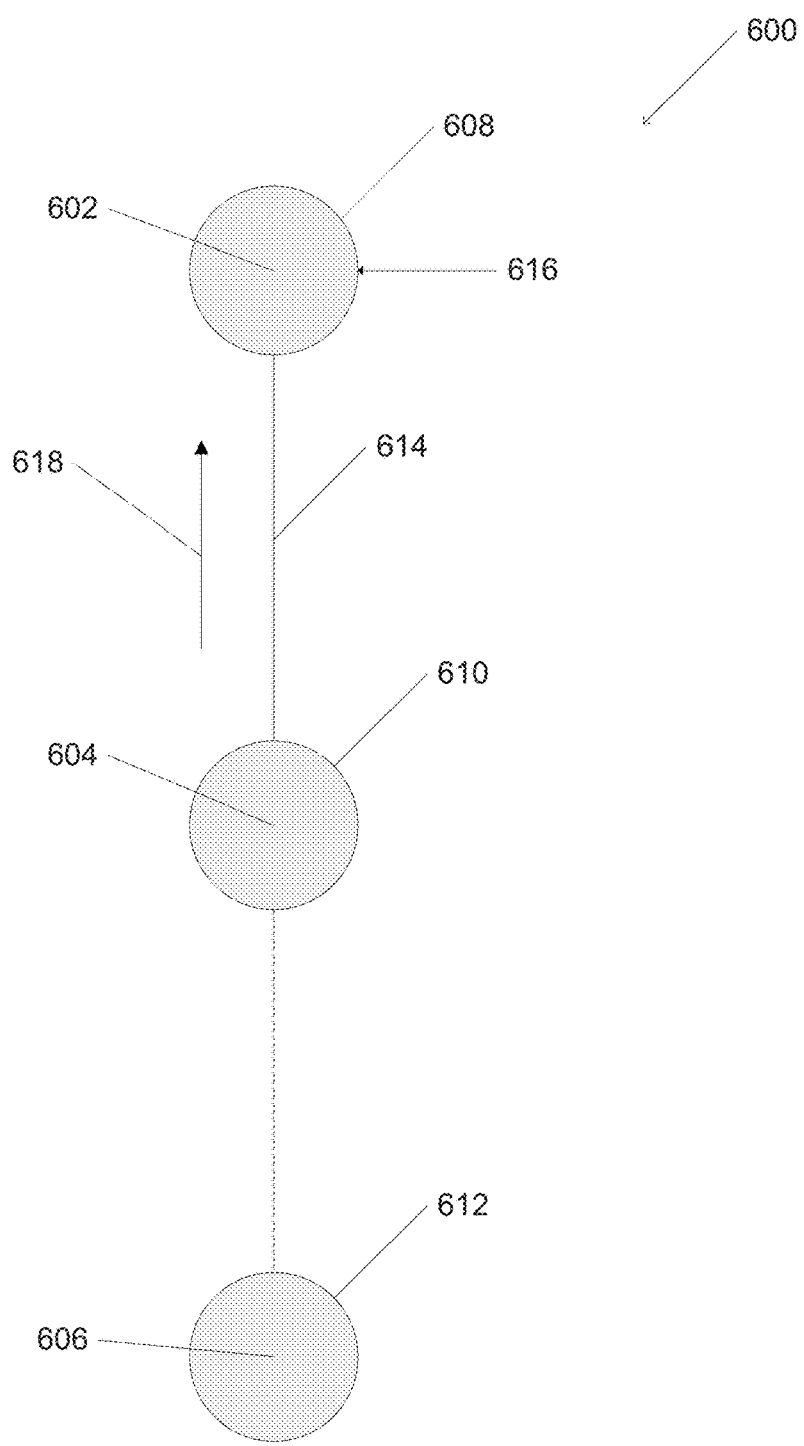
FIG. 6 is a diagram illustrating a relationship between nodes and operating parameters in an optimal power flow model in accordance with an embodiment of the invention.

The relationship between nodes and operating parameters in an OPF model in accordance with an embodiment of the invention is shown in FIG. 6. A node 602 has a unique ancestor node 604. Node 602 and unique ancestor node 604 are connected by line 614 and have a unique root node 606. Both node 602 and unique ancestor node 604 have a series of operating parameters. In many embodiments of the invention, operating parameters for node 602 include voltage 608 and power injection 616. Unique ancestor node 608 has corresponding voltage 610 and unique root node has a corresponding voltage 612. The line 614 also has operating parameters which for example include an impedance value as well as a current and/or power injection 618. The relationship between nodes and operating values will be discussed in greater detail below. Although various node operating parameters are described above with respect to FIG. 6, any of a variety of operating parameters can be controlled to achieve OPF as appropriate to the requirements of specific applications in accordance with embodiments of the invention.

In various embodiments, the following graph representation is utilized to represent at least a portion of a power distribution network. A substation node (bus) with a fixed voltage can be identified and assigned an index of 0, with the other downstream nodes (buses) in a set $\mathcal{N}$ assigned indexes of 1, 2, ..., n. The set of nodes (buses) without the node (bus) with a fixed voltage is $\mathcal{N}^+ = \mathcal{N} \setminus \{0\}$. Each line connects an ordered pair (i, j) of nodes (buses) where node (bus) i lies between node (bus) 0 and node (bus) j. The set of lines connecting nodes (buses) is represented by $\in$. Notations of an indication of connections between nodes (buses) $(i, j) \in$ and $i \to j$ can be used interchangeably, if $i \to j$ or $j \to i$, denote $i \sim j$.

The network can have three phases, a, b, c, where the phase of node (bus) $\in \mathcal{N}$ can be represented by $\Phi_i$, and $\Phi_{ij}$ can represent the phases of line $i \sim j$. For each node (bus), $i \in \mathcal{N}$, a voltage $V_i$ can be defined by the phase $\phi$ complex voltage for $\phi \in \Phi_i$, $V_i^\phi$ for $V_i := [V_i^\phi]_{\phi \in \Phi_i}$. In addition, a current $I_i$ can be defined as the phase $\phi$ current injection for $\phi \in \Phi_i$, $I_i^\phi$ for $I_i := [I_i^\phi]_{\phi \in \Phi_i}$. A power injection $s_i$ can be defined as the phase $\phi$ complex power injection for $\phi \in \Phi_i$, $s_i^\phi$ where $s_i := [s_i^\phi]_{\phi \in \Phi_i}$. For each line $i \sim j$, $I_{ij}^\phi$ denotes the phase $\phi$ current from node (bus) i to node (bus) j for $\phi \in \Phi_{ij}$ and $I_{ij}$ can be defined as $I_{ij} := [I_{ij}^\phi]_{\phi \in \Phi_{ij}}$. Moreover, $z_{ij}$ denotes the phase impedance matrix, where in many embodiments it is full rank and $y_{ij}$ can be defined as $y_{ij} := z_{ij}^{-1}$.

Superscripts can denote projection to specified phases, e.g., if $\Phi_i = abc$, then $$V_i^{ab} = (V_i^a, V_i^b)^T.$$

Nonexisting phase entries are filled by 0, e.g., if $\Phi_i = ab$, then $$V_i^{abc} = (V_i^a, V_i^b, 0)^T.$$

With regard to the discussion that follows, a letter without subscripts can denote a vector of the corresponding quantity, e.g., $z = [z_{ij}]_{i \sim j}$ and $s = [s_i]_{i \in \mathcal{N}}$.

Power Flows

Power flows can be governed by 1) Ohm's law: $I_{ij} = y_{ij}(V_i^{\Phi_{ij}} - V_j^{\Phi_{ij}})$, $i \sim j$, 2) current balance: $I_i = \Sigma_{j: i \sim j} I_{ij}^{\Phi_i}$, $i \in \mathcal{N}$, and 3) power balance: $s_i = \text{diag}(V_i I_i^H)$, $i \in \mathcal{N}$. In various embodiments, current variables $I_i$ and $I_{ij}$ can be eliminated and the above model reduces to the following bus injection model (BIM):

$$s_i = \sum_{j: i \sim j} \text{diag}\left[ V_i^{\Phi_{ij}} \left( V_i^{\Phi_{ij}} - V_j^{\Phi_{ij}} \right)^H y_{ij}^H \right]^{\Phi_i}, \quad i \in \mathcal{N}. \tag{4}$$

In many embodiments, processes are utilized that achieve OPF by determining the power injection that minimizes generation cost subject to physical and operational constraints. In other embodiments, any of a variety of processes that achieve OPF utilizing objectives appropriate to the requirements of specific applications can be utilized.

Generation cost can be separable. In some embodiments, $C_i(s_i): \mathbb{C}^{\Phi_i} \mapsto \mathbb{R}$ defines the generation cost at node (bus) $i \in \mathcal{N}$, and $$C(s) = \sum_{i \in \mathcal{N}} C_i(s_i)$$

can be the generation cost of the network,

OPF Operational Constraints

OFT has operational constraints on power injections and voltages besides physical constraints (4). First, while the substation power injection $s_0$ is unconstrained, a branch node (bus) power injection $s_i$ may vary within some externally specified set $\mathcal{S}_i$, i.e., $$s_i \in \mathcal{S}_i, i \in \mathcal{N}^+. \tag{5}$$

Second, while the substation voltage $V_0$ is fixed and given (denote by $V_0^{ref}$ that is nonzero componentwise), a branch node (bus) voltage can be regulated within a range, i.e., there exists $[\underline{V}_i^\phi, \overline{V}_i^\phi]_{i \in \mathcal{N}^+, \phi \in \Phi_i}$ such that $$V_0 = V_0^{ref}; \tag{6a}$$

$$\underline{V}_i^\phi \leq |V_i^\phi| \leq \overline{V}_i^\phi, i \in \mathcal{N}^+, \phi \in \Phi_i. \tag{6b}$$

In many embodiments, if voltages must stay within 5% from their nominal values, then $0.95 \leq |V_i^\phi| \leq 1.05$ per unit.

Formulating OPF Problem

Based upon the above, OPF can be formulated as

OPF:

$$\min \sum_{i \in \mathcal{N}} C_i(s_i)$$

over $s, V$ s.t. (4)-(6).

In several embodiments, the following assumptions can be utilized to solve the optimal power flow problem.
1. The network ($\mathcal{N}, \in$) is connected.
2. Voltage lower bounds are strictly positive, i.e., $$\underline{V}_i^\phi > 0, i \in \mathcal{N}^+, \phi \in \Phi_i.$$

3. Node (Bus) and line phases satisfy $$\Phi_i \supseteq \Phi_{ij} = \Phi_j, i \to j.$$

SDP Applied to BIM and BFM

Figure 7:
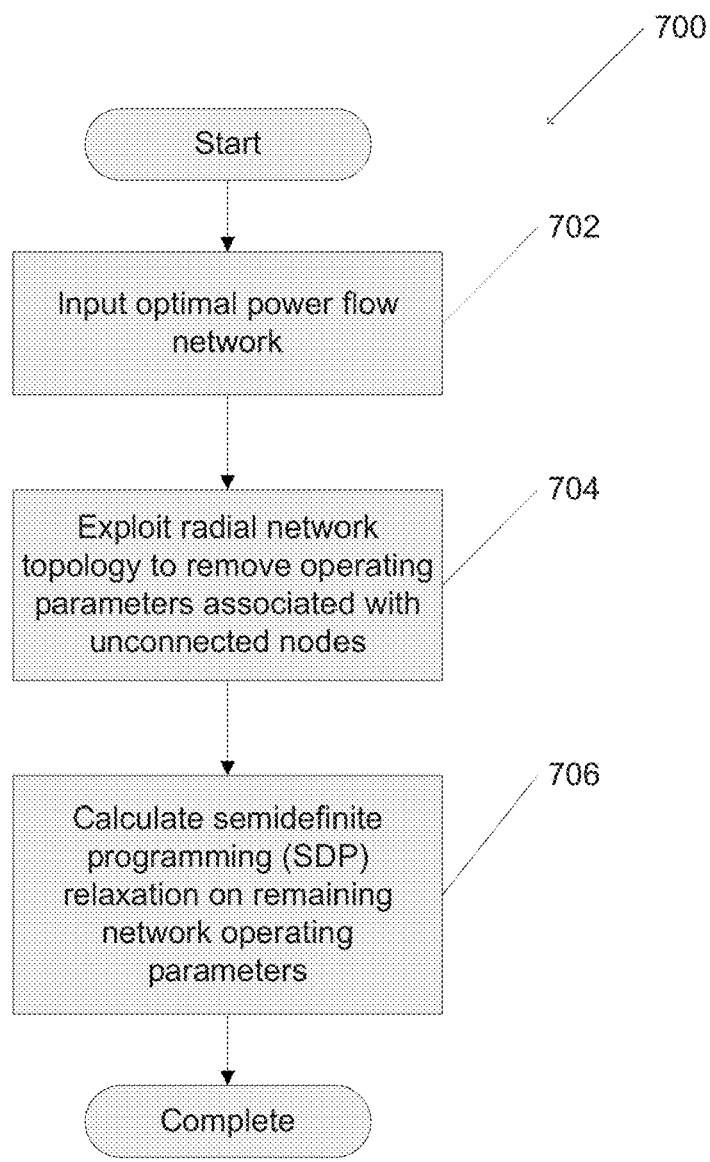
FIG. 7 is a flow chart illustrating a process for a semi-definite programming (SDP) relaxation of a radial network in accordance with an embodiment of the invention.

As discussed above, the calculations involved in determining operational parameters for individual nodes within a multiphase power distribution network that achieve OPF can be simplified by applying a convex relaxation to the OPF problem. An overview of a SDP relaxation of a radial network to solve for OPF, where nets cork topology is exploited for efficient calculations, is illustrated in FIG. 7. A radial optimal power flow network (such as a BIM or BFM) is utilized 702. The radial network topology is exploited 704 to remove operating parameters associated with nodes that are not interconnected. A SDP relaxation can be calculated 706 on the remaining network nodes. A detailed discussion of each step of a SDP relaxation with respect to a BIM and BFM similar to those described above with reference to FIG. 7 follows.

Bus Injection Model Semidefinite Programming

OPF is nonconvex due to (4), and a semidefinite programming (SDP) relaxation, BIM-SDP that exploits the radial network topology to reduce the computational complexity of the standard SDP can be utilized.

BIM-SDP can be derived by shifting the nonconvexity from (4) to some rank constraints and removing the rank constraints.

$|A|$ can be defined as the number of elements in a set A, and $\mathbb{H}^{k \times k}$ denotes the set of k×k complex Hermitian matrices. In addition, let $v_i \in \mathbb{H}^{|\Phi_i| \times |\Phi_i|}$ for $i \in \mathcal{N}$ and $W_{ij} \in \mathbb{C}^{|\Phi_{ij}| \times |\Phi_{ij}|}$ for $i \sim j$. If these matrices satisfy $$\begin{bmatrix} v_i^{\Phi_{ij}} & W_{ij} \\ W_{ji} & v_j \end{bmatrix} = \begin{bmatrix} v_i^{\Phi_{ij}} \\ V_j \end{bmatrix} \begin{bmatrix} v_i^{\Phi_{ij}} \\ V_j \end{bmatrix}^H, \quad i \rightarrow j,$$

then (4) is equivalent to $$s_i = \sum_{j: i \sim j} \text{diag}\left[(v_i^{\Phi_{ij}} - W_{ij}) y_{ij}^H\right]^{\Phi_i}, \quad i \in \mathcal{N}.$$

It can be proven that OPF can be equivalently formulated as BIM-OPF, which is illustrated below.

*BIM-OPF*:

$$\min \sum_{i \in N} C_i(s_i) \quad (7a)$$

over $s_i \in \mathbb{C}^{|\Phi_i|}$ and $v_i \in \mathbb{H}^{|\Phi_i| \times |\Phi_i|}$ for $i \in \mathcal{N}$;

$W_{ij} \in \mathbb{C}^{|\Phi_{ij}| \times |\Phi_{ij}|}$ for $i \sim j$, s.t. $s_i = \sum_{j: i \sim j} \text{diag}\left[(v_i^{\Phi_{ij}} - W_{ij}) y_{ij}^H\right]^{\Phi_i}, \quad i \in \mathcal{N};$ $s_i \in S_i, \quad i \in \mathcal{N}^+;$ (7b)

$v_0 = V_0^{ref}(V_0^{ref})^H;$ (7c)

$\underline{v}_i \leq \text{diag}(v_i) \leq \overline{v}_i, \quad i \in \mathcal{N}^+;$ (7d)

$W_{ij} = W_{ji}^H, \quad i \rightarrow j;$ (7e)

$\begin{bmatrix} v_i^{\Phi_{ij}} & W_{ij} \\ W_{ji} & v_j \end{bmatrix} \geq 0, \quad i \rightarrow j;$ (7f)

$\text{rank} \begin{bmatrix} v_i^{\Phi_{ij}} & W_{ij} \\ W_{ji} & v_j \end{bmatrix} = 1, \quad i \rightarrow j$ (7g)

where the vectors $\underline{v}_i$ and $\overline{v}_i$ in (7d) are defined as $\underline{v}_i := [(\underline{V}_i^\phi)^2]_{\phi \in \Phi_i}, \overline{v}_i := [(\overline{V}_i^\phi)^2]_{\phi \in \Phi_i}, i \in \mathcal{N}^+.$ If $C_i$ (in the objective) and $S_i$ are convex, then BIM-OPF is convex except for (7g), and an SDP relaxation can be obtained by removing (7g) from BIM-OPF.

*BIM-SDP*:

$$\min \sum_{i \in N} C_i(s_i)$$

over $s, v, W$ s.t. (7a)-(7f).

In some embodiments, BIM-SDP may be nonconvex due to $C_i$ and $S_i$.

If an optimal BIM-SDP solution $(s, v, W)$ satisfies (7g), then $(s, v, W)$ also solves BIM-OPF. Furthermore, a global optimum $(s, V)$ of OPF can be recovered.

Comparison of BIM-SDP and Standard-SDP Relaxation

A standard SDP relaxation of OPF has been proposed in the literature. It is derived by introducing $$\tilde{W} = \begin{bmatrix} V_0 \\ \vdots \\ V_n \end{bmatrix} \begin{bmatrix} V_1^H & \cdots & V_n^H \end{bmatrix}$$

to shift the nonconvexity from (4) in BIM-OPF to rank $\tilde{W}=1$, and removing the rank constraint. This relaxation will be called standard-SDP for ease of reference.

BIM-SDP is computationally more efficient than standard-SDP since it has fewer variables. It is straightforward to verify that there are $O(n)$ variables in BIM-SDP and $O(n^2)$ variables in standard-SDP.

Standard-SDP does not exploit the radial network topology. In $\tilde{W}$, only blocks corresponding to lines $i \sim j$ appear in other constraints than $\tilde{W} \geq 0$, i.e., if node (bus) i and node (bus) j are not connected, then block $(i, j)$ in $\tilde{W}$ only appears in $\tilde{W} \geq 0$. Since the network is radial, not all of the $(n+1)^2$ blocks in $\tilde{W}$ only appear in $\tilde{W} \geq 0$, leaving significant potential for exploring sparsity.

Call these blocks that only appear in $\tilde{W} \geq 0$ the $\tilde{W}$-only blocks and the other blocks the key-blocks. The role of having $\tilde{W}$-only blocks in the optimization is to make sure that the partial matrix specified by key-blocks can be completed to a positive semidefinite full matrix.

BIM-SDP can sometimes not be numerically stable. Therefore, in many embodiments, it is advantageous to use the BFM. The following section illustrates an alternative SDP relaxation for BFM.

Branch Flow Model Semidefinite Programming

A multiphase BFM of power flow can enhance the numerical stability of BIM (4). BIM (4) is ill-conditioned due to subtractions of $V_i^{|\Phi_{ij}|}$ and $V_j^{|\Phi_{ij}|}$ that are close in value, BFM can attain numerical stability by avoiding such subtractions.

BFM can be defined by the following three equations.

1. Ohm's law:

$$V_i^{\Phi_{ij}} = V_j + z_{ij} I_{ij}, i \rightarrow j. \quad (8)$$

2. Definition of slack variables:

$$l_{ij} = I_{ij} I_{ij}^H, S_{ij} = V_i^{\Phi_{ij}} I_{ij}^H, i \rightarrow j. \quad (9)$$

3. Power balance:

$$\sum_{i:i\to j} \text{diag}(S_{ij} - z_{kj}l_{ij}) + s_j = \sum_{k:j\to k} \text{diag}(S_{jk})^{\Phi_j}, \; j \in \mathcal{N}. \quad (10)$$

To interpret l and S, note that $\text{diag}(l_{ij})$ denotes the magnitude squares of current $I_{ij}$, and $\text{diag}(S_{ij})$ denotes the sending-end power flow on line i→j. To interpret (10), note that the receiving-end power flow on line i→j is $$\text{diag}(V_j I_{ij}^H) = \text{diag}(S_{ij} - z_{ij}l_{ij}).$$

BIM and BFM are equivalent in the sense that they share the same solution set (s, V). Similarly as described above with respect to BIM-OPF, it can be proven that OPF can be equivalently formulated as BFM-OPF. A more numerically stable SDP, BFM-SDP, that has a similar computational efficiency as BIM-SDP is additionally proposed and is illustrated below.

*BFM-OPF:*

$$\min \sum_{i \in \mathcal{N}} C_i(s_i) \quad (11a)$$

over $s_i \in \mathbb{C}^{|\Phi_i|}$, $v_i \in \mathbb{H}^{|\Phi_i| \times |\Phi_i|}$ for $i \in \mathcal{N}$;

$S_{ij} \in \mathbb{C}^{|\Phi_{ij}| \times |\Phi_{ij}|}$, $l_{ij} \in \mathbb{H}^{|\Phi_{ij}| \times |\Phi_{ij}|}$ for $i \to j$, s.t. $\sum_{i:i\to j} \text{diag}(S_{ij} - z_{ij}l_{ij}) + s_j = \sum_{k:j\to k} \text{diag}(S_{jk})^{\Phi_j}, \; j \in \mathcal{N}$;

$s_i \in S_i, \; i \in \mathcal{N}^+$; $\quad (11b)$ $v_0 = V_0^{ref}(V_0^{ref})^H$; $\quad (11c)$ $\underline{V}_i \le \text{diag}(v_i) \le \overline{V}_i, \; i \in \mathcal{N}^+$; $\quad (11d)$ $v_j = v_i^{\Phi_{ij}} - (S_{ij}z_{ij}^H + z_{ij}S_{ij}^H) + z_{ij}l_{ij}z_{ij}^H, \; i \to j$; $\quad (11e)$ $$\begin{bmatrix} v_i^{\Phi_{ij}} & S_{ij} \\ S_{ij}^H & l_{ij} \end{bmatrix} \succeq 0, \; i \to j; \quad (11f)$$

$$\text{rank}\begin{bmatrix} v_i^{\Phi_{ij}} & S_{ij} \\ S_{ij}^H & l_{ij} \end{bmatrix} = 1, \; i \to j. \quad (11g)$$

If $C_i$ and $S_i$ are convex, then BFM-OPF is convex except for (11g), and an SDP relaxation can be obtained by removing (11g) from BFM-OPF.

*BFM-SDP:*

$$\min \sum_{i \in \mathcal{N}} C_i(s_i)$$

over $s, v, S, l$ s.t. (11a)–(11f).

In many embodiments, BFM-SDP may be nonconvex due to $C_i$ and $S_i$.

BFM-SDP can be numerically more stability than BIM-SDP since it avoids subtractions of $v_i^{\Phi_{ij}}$ and $W_{ij}$ that are close in value. Meanwhile, BFM-SDP has similar computational efficiency as BIM-SDP since they have the same number of variables and constraints.

Centralized Linear Approximation of OPF

In various embodiments, a linear approximation of the power flow (LPF) is utilized. In many embodiments, LPF is obtained by utilizing the following assumptions:

B1 Small line losses, i.e., $z_{ij}l_{ij} \ll S_{ij}$ for i→j.

B2 Nearly balanced voltages, e.g., if $\Phi_i$=abc, then $$\frac{V_i^a}{V_i^b} \approx \frac{V_i^b}{V_i^c} \approx \frac{V_i^c}{V_i^a} \approx e^{j2\pi/3}.$$

With B1, the $z_{ij}l_{ij}$ terms can be omitted in (11a) and (11e) to obtain $$\sum_{i:i\to j} \text{diag}(S_{ij}) + s_j = \sum_{k:j\to k} \text{diag}(S_{jk})^{\Phi_j}, \; j \in \mathcal{N}; \quad (12a)$$

$$v_j = v_i^{\Phi_{ij}} - (S_{ij}z_{ij}^H + z_{ij}S_{ij}^H), \; i \to j. \quad (12b)$$

In many embodiments, given $s_j$ for $j \in \mathcal{N}^+$, (12a) determines uniquely $s_0$ and $\text{diag}(S_{ij})$ for i→j, but not the off-diagonal entries of $S_{ij}$. B2 can be used to approximate the off-diagonal entries in $S_{ij}$ with $\text{diag}(S_{ij})$.

In addition, α, β, and γ can be defined as $$\alpha := e^{-j2\pi/3}, \; \beta := \begin{bmatrix} 1 \\ \alpha \\ \alpha^2 \end{bmatrix}, \; \gamma := \begin{bmatrix} 1 & \alpha^2 & \alpha \\ \alpha & 1 & \alpha^2 \\ \alpha^2 & \alpha & 1 \end{bmatrix}.$$

Assuming the voltages to be balanced, then $$S_{ij} = V_i^{\Phi_{ij}} I_{ij}^H \in \text{range}(\beta^{\Phi_{ij}}), i \to j.$$

It can follow that if $\Lambda_{ij} = \text{diag}(S_{ij})$, $\text{diag}(\Lambda_{ij})$ is a diagonal matrix with diagonal $\Lambda_{ij}$, then $$S_{ij} = \gamma^{\Phi_{ij}} \text{diag}(\Lambda_{ij}).$$

Centralized Linear Approximation LPF

Based upon the above, (12) can be approximated by

*LPF:*

$$\sum_{i:i\to j} \Lambda_{ij} + s_j = \sum_{k:j\to k} \Lambda_{jk}^{\Phi_j}, \; j \in \mathcal{N}; \quad (13a)$$

$$S_{ij} = \gamma^{\Phi_{ij}} \text{diag}(\Lambda_{ij}), \; i \to j; \quad (13b)$$

$$v_j = v_i^{\Phi_{ij}} - S_{ij}z_{ij}^H - z_{ij}S_{ij}^H, \; i \to j. \quad (13c)$$

In various embodiments, given $s_j$ for $j \in \mathcal{N}^+$ and $v_0$, (13) can determine uniquely $s_0$, $(\Lambda_{ij}, S_{ij})$ for i→j, and $v_j$ for $j \in \mathcal{N}^+$ as $$s_0 = -\sum_{k \in \mathcal{N}^+} s_k^{\Phi_0};$$

$$\Lambda_{ij} = -\sum_{k \in Down(j)} s_k^{\Phi_{ij}}, \; i \to j;$$

$$S_{ij} = \gamma^{\Phi_{ij}} \text{diag}(\Lambda_{ij}), \; i \to j;$$

-continued $$v_j = v_0^{\Phi_j} - \sum_{(k,l) \in \mathcal{P}_j} [S_{kl} z_{kl}^H + z_{kl} S_{kl}^H]^{\Phi_j}, \quad j \in \mathcal{N}^+$$

where $\mathcal{P}_j$ denotes the path from node (bus) 0 to node (bus) j and Down(j) denotes the downstream of j for $j \in \mathcal{N}^+$.

Implementation of LPF in a Power Distribution Network

Figure 8:
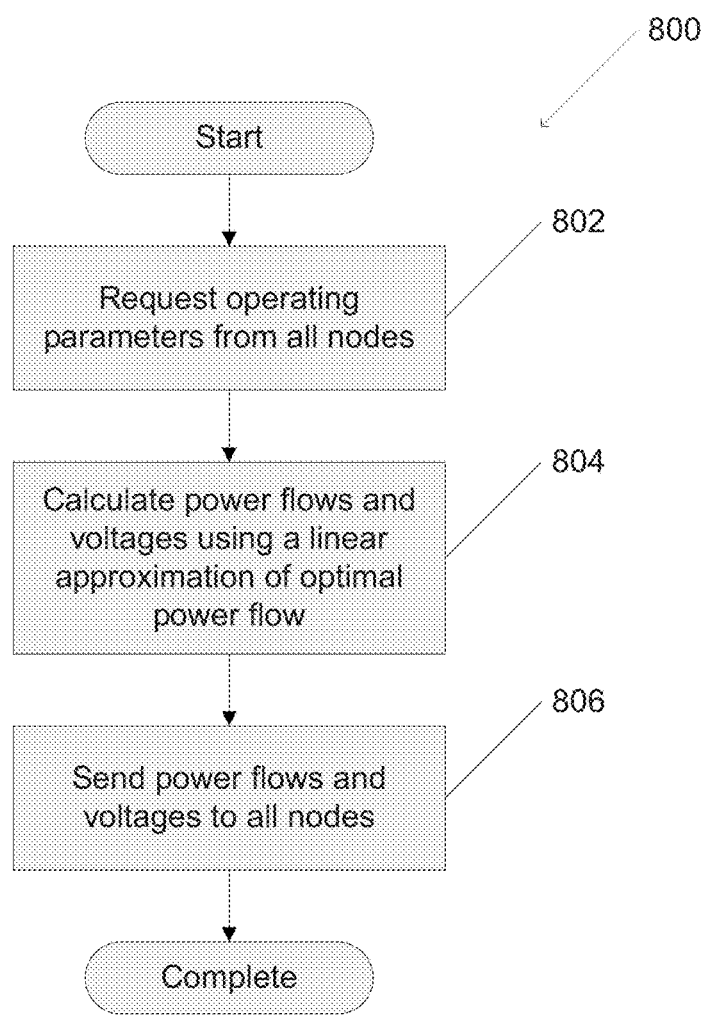
FIG. 8 is a flow chart illustrating a process for solving for optimal power flow utilizing a linear approximation and a centralized computing system in accordance with an embodiment of the invention.

As noted above, operating parameters for nodes in a power distribution network can be determined centrally by solving the linearized approximation of the BFM-SDP relaxation of the OPF problem discussed above. Various processes for determining node operating parameters and distributing the operating parameters to update the operation of nodes within a power distribution network can be utilized. A process that can be performed by a centralized computing system for solving for optimal power flow utilizing a linear approximation is illustrated in FIG. 8. In the illustrated process, operating parameters can be requested 802 from nodes and/or node controllers in the power distribution network directly and/or indirectly by a centralized computing system as shown in FIG. 2. Operating parameters such as power flows and voltages can be calculated 804 using a linear approximation of optimal power flow by the centralized computing system. The centralized computing system sends 806 power flow and voltage parameters to all nodes in the power distribution network. A detailed discussion of the linear approximation follows. Although solving for OPF using a linear approximations is described with reference to FIG. 8, any of a variety of centralized calculations to solve for OPF can be utilized as appropriate to the requirements of specific applications in accordance with embodiments of the invention. Processes that can be utilized by node controllers to approach optimal power flow in a power distribution network utilizing a linear approximation are discussed further below.

Figure 9:
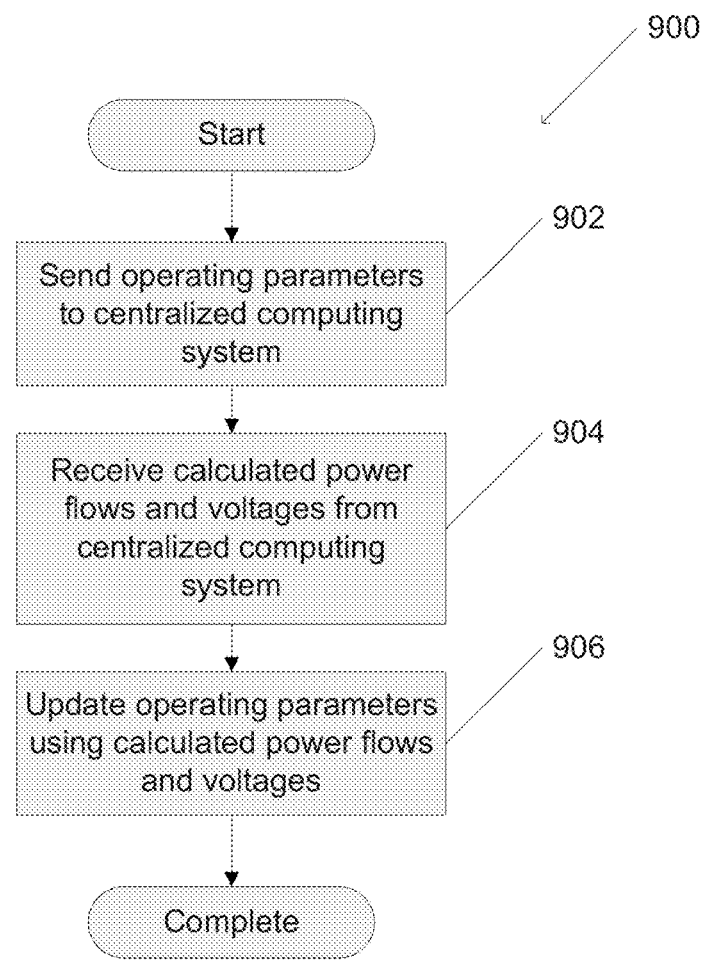
FIG. 9 is a flow chart illustrating a process for solving for optimal power flow utilizing a linear approximation and a node controller in accordance with an embodiment of the invention.

A process that can be performed by a node controller to achieving optimal power flow utilizing a linear approximation in accordance with an embodiment of the invention is illustrated in FIG. 9. The process 900 includes sending 902 operating parameters to a centralized computing system. After the centralized computer performs calculations using a linear approximation in a manner similar to the processes discussed above with reference to FIG. 8, operating parameters such as (but not limited to) power flow and voltage are received 904 from the centralized computing system. Node operating parameters can be updated 906 based on the operating parameters received from the centralized computing system. Although adjusting nodes at the individual level to achieve OPF is described with reference to FIG. 9, any of a variety of processes for a node and/or node controller to communicate with a centralized computing system and adjust operating parameters can be utilized as appropriate to the requirements of specific applications in accordance with embodiments of the invention.

Simulations described below show that LPF provides a good estimate of power flows Λ and voltages v.

Simulations of OPF performance in Power Distribution Networks using BIM-SDP and BFM-SDP Relaxations BIM and BFM network simulations can be performed with the following simplifications: 1) transformers are simulated as lines with appropriate impedances; 2) circuit switches are simulated as open or short lines depending on the status of the switch; 3) regulators are simulated as having a fixed voltage (the same as the substation); 4) distributed load on a line is simulated as two identical loads located at two end nodes (buses) of the line; and 5) line shunt is simulated using the π model—assuming a fixed impedance load at each end of the line with the impedance being half of the line shunt. The real-world network simulation is modeled after is located in a residential/commercial area in Southern California. All simulations were performed using a laptop with Intel Core 2 Duo CPU at 2.66 GHz, 4G RAM, and MAC OS 10.9.2, MATLAB R_2013a.

The OPF simulation is as follows. The objective is power loss, i.e., $$C(s) = \sum_{i \in \mathcal{N}} \sum_{\phi \in \Phi_i} \text{Re}(s_i^\phi).$$

The power injection constraint (5) is set up such that 1. for a node (bus) i representing a shunt capacitor with nameplate capacity $\bar{q}_i$, $$\mathcal{S}_i = \{s \in \mathbb{C}^{|\Phi_i|} | Re(s_i)=0, 0 \leq Im(s_i) \leq \bar{q}_i\};$$

2. for a solar photovoltaic node (bus) i with real power generation $p_i$ and nameplate rating $\bar{s}_i$, $$\mathcal{S}_i = \{s \in \mathbb{C}^{|\Phi_i|} | Re(s_i)=p_i, |s_i| \leq \bar{s}_i\};$$

3. for a node (bus) i with multiple devices, $\mathcal{S}_i$ is the summation of above mentioned sets.

Two choices of the voltage constraint (6) are considered:
1. $\underline{V}_i^{\Phi_i} = 0.95$ and $\overline{V}_i^{\Phi_i} = 1.05$ for $i \in \mathcal{N}^+$ and $\phi \in \Phi_i$;
2. $\underline{V}_i^{\Phi_i} = 0.90$ and $\overline{V}_i^{\Phi_i} = 1.10$ for $i \in \mathcal{N}^+$ and $\phi \in \Phi_i$.

BIM-SDP and BFM-SDP are applied to solve OPF. In particular, the generic optimization solver sedumi is used to solve them and results are summarized in FIGS. 10A-10B. FIG. 10A summarizes the simulation results with $\underline{V}=0.95$ and $\overline{V}=1.05$, and FIG. 10B summarizes the simulations results with $\underline{V}=0.9$ and $\overline{V}=1.1$. The (value, time, ratio) triple is simulated for each of the (network, relaxation) pairs. For example, in FIG. 10A, the (value, time, ratio) triple for the (BIM-SDP, IEEE 13-bus) pair is (152.7, 1.08, 9.5e-9).

The entry "value" stands for the objective value in kilowatts. In the simulation illustrated in FIG. 10A, with 5% voltage flexibility, the minimum power loss of the IEEE 13-bus network computed using BIM-SDP is 152.7 kW.

The entry "time" stands for the running time in seconds. In the simulation illustrated in FIG. 10A, with 5% voltage flexibility, it takes 1.05 s to solve BIM-SDP for the IEEE 13-bus network.

The entry "ratio" quantifies how close is an SDP solution to rank one. Due to finite numerical precision, even if BIM-SDP (BFM-SDP) is exact, its numerical solution only approximately satisfies (7g) [(11g)], i.e., the matrices in (7g) [(11g)] is only approximately rank one. To quantify how close are the matrices to rank one, a ratio $|\lambda_2/\lambda_1|$ their largest two eigenvalues $\lambda_1, \lambda_2$ ($|\lambda_1| \geq |\lambda_2| \geq 0$) is utilized. The smaller the ratio, the closer the matrices are to rank one. The maximum ratio over all matrices in (7g) [(11g)] is the entry "ratio". In the simulation illustrated in FIG. 10A, with 5% voltage flexibility, the solution of BIM-SDP for the IEEE 13-bus network satisfies $|\lambda_2/\lambda_1| \leq 9.5 \times 10^{-9}$ for all matrices in (7g). Hence, BIM-SDP is numerically exact.

With 10% voltage flexibility simulation as illustrated in FIG. 10B, BFM-SDP is numerically exact for all test networks while BIM-SDP is numerically exact only for 2 test networks. This highlights that BFM-SDP is numerically more stable than BIM-SDP, since both SDPs should be exact simultaneously if there are infinite digits of precision. When voltage flexibility reduces to 5%, the OPF for the IEEE 13-bus network becomes infeasible. Consequently, BFM-SDP is not numerically exact in this case.

Based upon the above, BFM-SDP is numerically exact for up to 2000-bus networks when OPF is feasible, while BIM-SDP gets into numerical difficulties for as few as 34-bus networks. The accuracy of LPF (13) is evaluated in this section. In particular, given the optimal power injections computed by BFM-SDP, a forward backward sweep algorithm (FBS) is utilized to simulate the real values for power flows and voltage magnitudes. LPF can be utilized to simulate the estimated power flows and voltage magnitudes, and the differences between FBS and LPF compare their simulated differences. The results are summarized in FIG. 11. FIG. 11 illustrates that the voltages are within 0.0016 per unit and the power flows are within 5.3% of their simulated true values for all test networks. This highlights the accuracy of simulated LPF (13).

Although the present invention has been described in certain specific aspects, many additional modifications and variations would be apparent to those skilled in the art. It is therefore to be understood that the present invention can be practiced otherwise than specifically described without departing from the scope and spirit of the present invention including (but not limited to) performing the centralized process with respect to a sub-network only or in a hybrid implementation of an OPF process in which some nodes are controlled in a distributed manner and communicate with ancestor and/or children nodes. Thus, embodiments of the present invention should be considered in all respects as illustrative and not restrictive. Accordingly, the scope of the invention should be determined not by the embodiments illustrated, but by the appended claims and their equivalents.

What is claimed is:

1. A centralized node controller, comprising:
   a network interface;
   a processor; and
   a memory, containing:
      a centralized power control application:
      a network topology, where the network is multiphase unbalanced and comprises a plurality of connected noes;
   wherein the processor is configured by the centralized controller application to:
      request node operating parameters from the plurality of connected nodes;
      calculate network operating parameters using a linear approximation of optimal power flow and the node operating parameters from the plurality of connected nodes; and
      send network operating parameters to the plurality of connected nodes, wherein the linear approximation of optimal power flow is evaluated using the following expressions:

LPF:

$$\sum_{i:\, i \to j} \Lambda_{ij} + s_j = \sum_{k:\, j \to k} \Lambda_{jk}^{\Phi_j}, \quad j \in \mathcal{N};$$

$$S_{ij} = \gamma^{\Phi_{ij}} \mathrm{diag}(\Lambda_{ij}), \quad i \to j;$$

$$v_j = v_i^{\Phi_{ij}} - S_{ij} z_{ij}^H - z_{ij} S_{ij}^H, \quad i \to j,$$

where i, j, and k are nodes in the plurality of connected nodes, $\Lambda$ and S are power flows, s is a complex power injection, v is a voltage, z is a phase impedance matrix, and y is a matrix of constants.

2. The centralized node controller of claim 1, wherein the linear approximation of optimal power flow further comprises the assumption of small line losses.

3. The centralized node controller of claim 1, wherein the linear approximation of optimal power flow further comprises the assumption of nearly balanced voltage.

4. The centralized node controller of claim 1, wherein the network topology further comprises a radial network.

5. The centralized node controller of claim 1, wherein the network topology further comprises a network on Kirchoffs laws.

6. The centralized node controller of claim 1, wherein the network topology further comprises a bus injection model (BIM) network model.

7. The centralized node controller of claim 1, wherein the network topology comprises a branch flow model (BFM) network model.

8. The centralized node controller of claim 1, wherein node operating parameters include power flow and voltage.

9. The centralized node controller of claim 1, wherein each node in the plurality of connected nodes comprises a node controller, wherein the node controller comprises:
   a node network interface;
   a node processor:
   a node memory containing:
      a node controller application; and
      a plurality of individual node operating parameters describing the operating parameters of a node in the plurality of connected nodes;
   wherein the node processor is configured by the node controller application to:
      send individual node operating parameters to the centralized node controller;
      receive network operating parameters from the centralized node controller;
      calculate updated individual node operating parameters using network operating parameters; and
      adjust the individual node operating parameters.

10. A centralized node controller, comprising:
   a network interface;
   a processor; and
   a memory, containing:
      a centralized power control application:
      a network topology, where the network is multiphase unbalanced and comprises a plurality of connected noes;
   wherein the processor is configured by the centralized controller application to:
      request node operating parameters from the plurality of connected nodes;
      calculate network operating parameters using a linear approximation of optimal power flow and the node operating parameters from the plurality of connected nodes; and
      send network operating parameters to the plurality of connected nodes, wherein the network topology is simplified using a convex relaxation, wherein the convex relaxation is semidefinite programming (SDP) relaxation, where in the SDP relaxation exploits a radial network topology, wherein the network topology further comprises a bus injection model (BIM) network topology, and where in the SDP relaxation exploiting a radial network topology further comprises a BIM-SDP which is evaluated using the following expression:

$$BIM\text{-}SDP:$$
$$\min \sum_{i \in N} C_i(s_i)$$
$$\text{over } s, v, W$$

where i is a node in the plurality of connected nodes, N is the plurality of connected nodes, s is a power injection, v is a voltage, C is a function of optimal power flow, and W is a constraint.

11. The centralized node controller of claim 10, wherein the BIM-SDP is subject to constraints.

12. The centralized node controller of claim 10, wherein the constraints are evaluated using the following expressions:

$$\min \sum_{i \in N} C_i(s_i)$$
$$\text{over } s_i \in \mathbb{C}^{|\Phi_i|} \text{ and } v_i \in \mathbb{H}^{|\Phi_i| \times |\Phi_i|} \text{ for } i \in \mathcal{N};$$
$$W_{ij} \in \mathbb{C}^{|\Phi_{ij}| \times |\Phi_{ij}|} \text{ for } i \sim j,$$
$$\text{s.t. } s_i = \sum_{j:\, i \sim j} \text{diag}\big[(v_i^{\Phi_{ij}} - W_{ij}) y_{ij}^H\big]^{\Phi_i}, \quad i \in \mathcal{N};$$
$$s_i \in S_i, \quad i \in \mathcal{N}^+;$$
$$v_0 = V_0^{ref}(V_0^{ref})^H;$$
$$\underline{v_i} \le \text{diag}(v_i) \le \overline{v}_i, \quad i \in \mathcal{N}^+;$$
$$W_{ij} = W_{ji}^H, \quad i \to j;$$
$$\begin{bmatrix} v_i^{\Phi_{ij}} & W_{ij} \\ W_{ji} & v_j \end{bmatrix} \succeq 0, \quad i \to j;$$

where i, and j, are nodes in the plurality of connected nodes, N is the plurality of connected nodes, C is a function of optimal power flow, s is a power flow, $\mathbb{C}$ is a complex matrix, v and V are voltages, $\mathbb{H}$ is a set of complex Hermitian matrices, φ is a phase, y is an inverse phase impedance matrix, and W is a constraint.

13. A centralized node controller, comprising:
  a network interface;
  a processor; and
  a memory, containing:
    a centralized power control application:
    a network topology, where the network is multiphase unbalanced and comprises a plurality of connected noes;
  wherein the processor is configured by the centralized controller application to:
    request node operating parameters from the plurality of connected nodes;
    calculate network operating parameters using a linear approximation of optimal power flow and the node operating parameters from the plurality of connected nodes; and
    send network operating parameters to the plurality of connected nodes, wherein the network topology is simplified using a convex relaxation, wherein the convex relaxation is semidefinite programming (SDP) relaxation, where in the SDP relaxation exploits a radial network topology, wherein the network topology further comprises a branch flow model (BFM) network topology, and wherein the SDP relaxation exploiting a radial network topology further comprises a BFM-SDP which is evaluated using the following expression:

$$BFM\text{-}SDP:$$
$$\min \sum_{i \in N} C_i(s_i)$$
$$\text{over } s, v, S, l$$

where i is a node in the plurality of connected nodes, N is the plurality of connected nodes, s is a power injection, v is a voltage, C is a function of optimal power flow, S is a power flow, and l is a slack variable.

14. The centralized node controller of claim 13, wherein BFM-SDP is subject to constraints.

15. The centralized node controller of claim 14, wherein the constraints are evaluated using the following expressions:

$$\min \sum_{i \in N} C_i(s_i)$$
$$\text{over } s_i \in \mathbb{C}^{|\Phi_i|}, v_i \in \mathbb{H}^{|\Phi_i| \times |\Phi_i|} \text{ for } i \in \mathcal{N};$$
$$S_{ij} \in \mathbb{C}^{|\Phi_{ij}| \times |\Phi_{ij}|}, l_{ij} \in \mathbb{H}^{|\Phi_{ij}| \times |\Phi_{ij}|} \text{ for } i \to j,$$
$$\text{s.t. } \sum_{i:\, i \to j} \text{diag}(S_{ij} - z_{ij} l_{ij}) + s_j = \sum_{k:\, j \to k} \text{diag}(S_{jk})^{\Phi_j}, \; j \in \mathcal{N};$$
$$s_i \in S_i, \quad i \in \mathcal{N}^+;$$
$$v_0 = V_0^{ref}(V_0^{ref})^H;$$
$$\underline{V}_i \le \text{diag}(v_i) \le \overline{V}_i, \quad i \in \mathcal{N}^+;$$
$$v_j = v_i^{\Phi_{ij}} - (S_{ij} z_{ij}^H + z_{ij} S_{ij}^H) + z_{ij} l_{ij} z_{ij}^H, \quad i \to j;$$
$$\begin{bmatrix} v_i^{\Phi_{ij}} & S_{ij} \\ S_{ij}^H & l_{ij} \end{bmatrix} \succeq 0, \quad i \to j;$$

where i, j, and k are nodes in the plurality of connected nodes, N is the plurality of connected nodes, C is a function of optimal power flow, s is a power flow, $\mathbb{C}$ is a complex matrix, v and V are voltages, $\mathbb{H}$ is a set of complex Hermitian matrices, φ is a phase, S is a power flow, l is a slack variable, and z is a phase impedance matrix.

* * * * *